(No Model.)
J. M. MORGAN.
PRUNING IMPLEMENT.
No. 470,586. Patented Mar. 8, 1892.
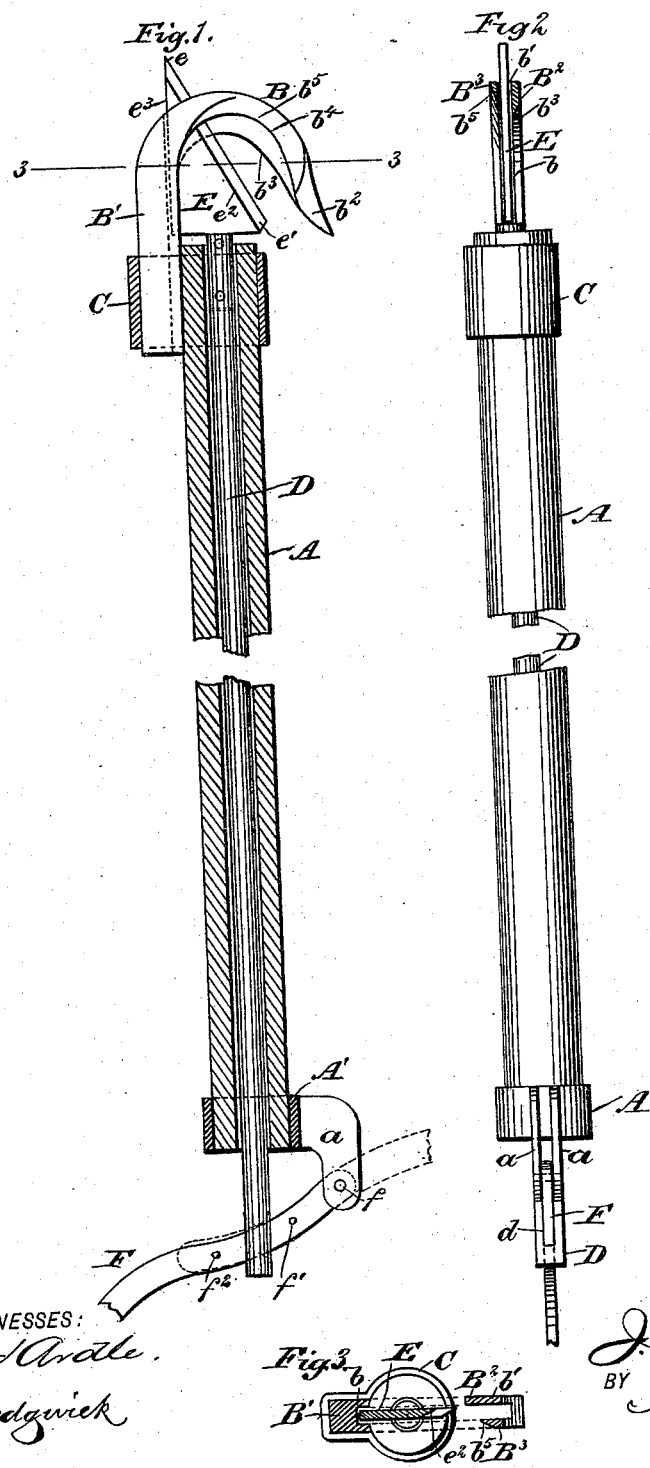
WITNESSES:
INVENTOR:
J. M. Morgan
BY Munn & Co.
ATTORNEYS

UNITED STATES PATENT OFFICE.

JESSE M. MORGAN, OF CHETOPA, KANSAS.

PRUNING IMPLEMENT.

SPECIFICATION forming part of Letters Patent No. 470,586, dated March 8, 1892.

Application filed June 16, 1891. Serial No. 396,440. (No model.)

*To all whom it may concern:*

Be it known that I, JESSE M. MORGAN, of Chetopa, in the county of Labette and State of Kansas, have invented a new and Improved Pruning Implement, of which the following is a full, clear, and exact description.

The invention relates to that class of pruning implements in which a cutting-tool is employed in connection with a hook, the latter serving to hold the branch or limb while the same is being severed by the cutting-tool.

The object of the invention is to improve such implements, to the end that the knife will be properly guided and braced against the tendency to be diverted by the resistance of the branch being severed, and whereby the knife will also, when desired, make a shearing cut while itself having a straight path of movement.

The invention consists in the construction and arrangement of parts hereinafter described, and pointed out in the claims.

Reference is to be had to the accompanying drawings, forming a part of this specification, in which similar letters of reference indicate corresponding parts in all the figures.

Figure 1 is a broken side elevation of a pruning implement embodying my improvements, the handle or body being in section. Fig. 2 is a front elevation, the hook being in section. Fig. 3 is a sectional plan view, the section being taken on the line 3 3, Fig. 1.

In constructing a pruning implement embodying my invention I provide an elongated tubular body or handle A, to the upper end of which is secured a hook B, the connection of the hook to the body being effected in any suitable manner—as, for instance, by means of a ferrule or strap C.

Within the body A is fitted a rod D, which is arranged for longitudinal movement, and on the upper end of the said rod and in fixed relation thereto a knife E is secured for severing the branch or limb.

The knife E is inclined from its point $e$ to the heel $e'$, and such inclined edge is beveled at one side, as at $e^2$, or formed with other suitable cutting-edge. The back $e^3$ of the knife rides in a vertical groove $b$, formed in the shank B' of the hook B, and the point of the knife projects through or into a slot $b'$, which is formed in the hook proper, following said hook from the slotted shank B' to near the point $b^2$. The slot $b'$ thus divides the hook into the two members $B^2$ $B^3$, of which the member $B^2$ extends at its inner or lower edge $b^3$ beyond the corresponding edge $b^4$ of the member $B^3$, and said projecting edge $b^3$ is sharpened to have a proper cutting action in connection with the knife E. Further, the member $B^3$ is preferably beveled at the outer face, as at $b^5$.

It will be seen that the member $B^3$ being set back or inward from the edge of the member $B^2$ will, when the implement is turned by the operator, cause the branch over which the hook is placed to range itself in an inclined position between the knife E and the lower edge $b^3$ of the member $B^2$ of the hook, and thus the knife will sever the branch with a drawing or shearing cut instead of cutting at right angles to the length of the branch. Further, the member $B^3$ forms a guard and serves to guide the knife during the complete movement of the latter against the tendency to be diverted by the branch being severed.

The lower end of the rod D projects beyond the body A and is provided with an operating-lever F, which I arrange in the following novel manner: A ferrule A' is secured on the body A and formed with lugs $a$, between which the lever F is pivoted by a pin $f$. When it is desired to cause the knife E to cut in response to an upward or pulling movement on the lever F, the latter is passed through a slot $d$ in the reciprocating rod D, and its extreme end is then secured by the pin $f$, so that when the lever is pulled upward or forward the rod D and the knife E will be given a corresponding movement. Instead of pivoting the end of the lever between the lugs $a$, the pin $f$ may be removed and the lever reversed, with its end engaging the lower end of the rod D (see dotted lines, Fig. 1) and its aperture $f^2$ (see full lines, Fig. 1) in line with the lug-apertures, so that the pin $f$ may be passed therethrough. A downward movement of the handle end of the lever will result in an upward movement of the rod D and knife E. Thus the lever may be arranged to operate the knife by whichever movement may be most convenient to the operator. An additional pivot hole or holes $f'$ may be formed in the lever for varying the movement, if desired.

Having thus described my invention, what I claim as new, and desire to secure by Letters Patent, is—

1. A pruning implement comprising a handle, a hook having a shank projecting longitudinally from the upper end of the handle, the point of the hook projecting downward and outward from the handle to hook over a limb by a downward pull, and a longitudinally-reciprocating triangular knife E, the outer inclined edge of which is the cutting-edge, the lower edge or base of the knife being of less width than the space between the shank and point of the hook, substantially as set forth.

2. A pruning implement having a hook and a reciprocating knife, the shank of the hook having a longitudinal groove in which the back of the knife is fitted, and the hook proper having a slot through which the knife moves in the forward or cutting movement, substantially as described.

3. A pruning implement provided with a slotted hook B, having a shank B', the point of the hook projecting downward and outward from the shank and the member $B^2$, formed by the slot being set inward from other member $B^3$, and the reciprocating triangular knife E, extending through the slot with its inclined cutting-edge outermost, the base or lower end of the knife being of less width than the space between the point $b^2$ and shank of the hook to permit the entrance of a limb when the hook is pulled downward, substantially as set forth.

4. The combination, with the handle having a hook and a reciprocating knife operating in connection therewith and provided with an operating-rod D, having a slot $d$ through its lower end, of a reversible lever pivotally connected with the handle by a removable pin $f$ and engaging said slot beyond its pivotal point, whereby by removing the pin the lever may be set to throw the knife by an upward or downward movement, substantially as set forth.

JESSE M. MORGAN.

Witnesses:
MYRON E. STEVENS,
W. I. ALLEN.